United States Patent
Ahn

(10) Patent No.: US 9,887,404 B2
(45) Date of Patent: Feb. 6, 2018

(54) SECONDARY BATTERY

(75) Inventor: Chang-Bum Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 835 days.

(21) Appl. No.: 13/463,890

(22) Filed: May 4, 2012

(65) Prior Publication Data

US 2012/0301777 A1 Nov. 29, 2012

Related U.S. Application Data

(60) Provisional application No. 61/457,745, filed on May 25, 2011.

(51) Int. Cl.
| | |
|---|---|
| H01M 10/04 | (2006.01) |
| H01M 2/04 | (2006.01) |
| H01M 2/12 | (2006.01) |
| H01M 2/02 | (2006.01) |
| H01M 2/34 | (2006.01) |
| H01M 10/42 | (2006.01) |

(52) U.S. Cl.
CPC ....... *H01M 2/1282* (2013.01); *H01M 2/0212* (2013.01); *H01M 2/0404* (2013.01); *H01M 2/348* (2013.01); *H01M 10/0436* (2013.01); *H01M 10/4235* (2013.01); *H01M 2200/103* (2013.01)

(58) Field of Classification Search
CPC .. H01M 2/021; H01M 2/0212; H01M 2/0207; H01M 2/0404; H01M 2/0478; H01M 2/0491; H01M 2/0495
See application file for complete search history.

(56) References Cited

U.S. PATENT DOCUMENTS

| | | | | |
|---|---|---|---|---|
| 2005/0101712 | A1* | 5/2005 | Miller et al. | 524/275 |
| 2005/0196664 | A1* | 9/2005 | Shimoyamada et al. | 429/94 |
| 2006/0260840 | A1* | 11/2006 | Kim | 174/377 |
| 2009/0023064 | A1* | 1/2009 | Kim et al. | 429/209 |
| 2009/0169983 | A1* | 7/2009 | Kumar et al. | 429/120 |

FOREIGN PATENT DOCUMENTS

| | | |
|---|---|---|
| KR | 10-2006-0044412 A | 5/2006 |
| KR | 10-2008-0006819 A | 1/2008 |
| KR | 10-0876268 B1 | 12/2008 |

* cited by examiner

*Primary Examiner* — Ula C Ruddock
*Assistant Examiner* — Matthew W Van Oudenaren
(74) *Attorney, Agent, or Firm* — Lee & Morse, P.C.

(57) ABSTRACT

A secondary battery includes an electrode assembly and at least one safety member coupled with the electrode assembly. The safety member has a safety layer including a short-circuit heat absorbing material.

19 Claims, 5 Drawing Sheets

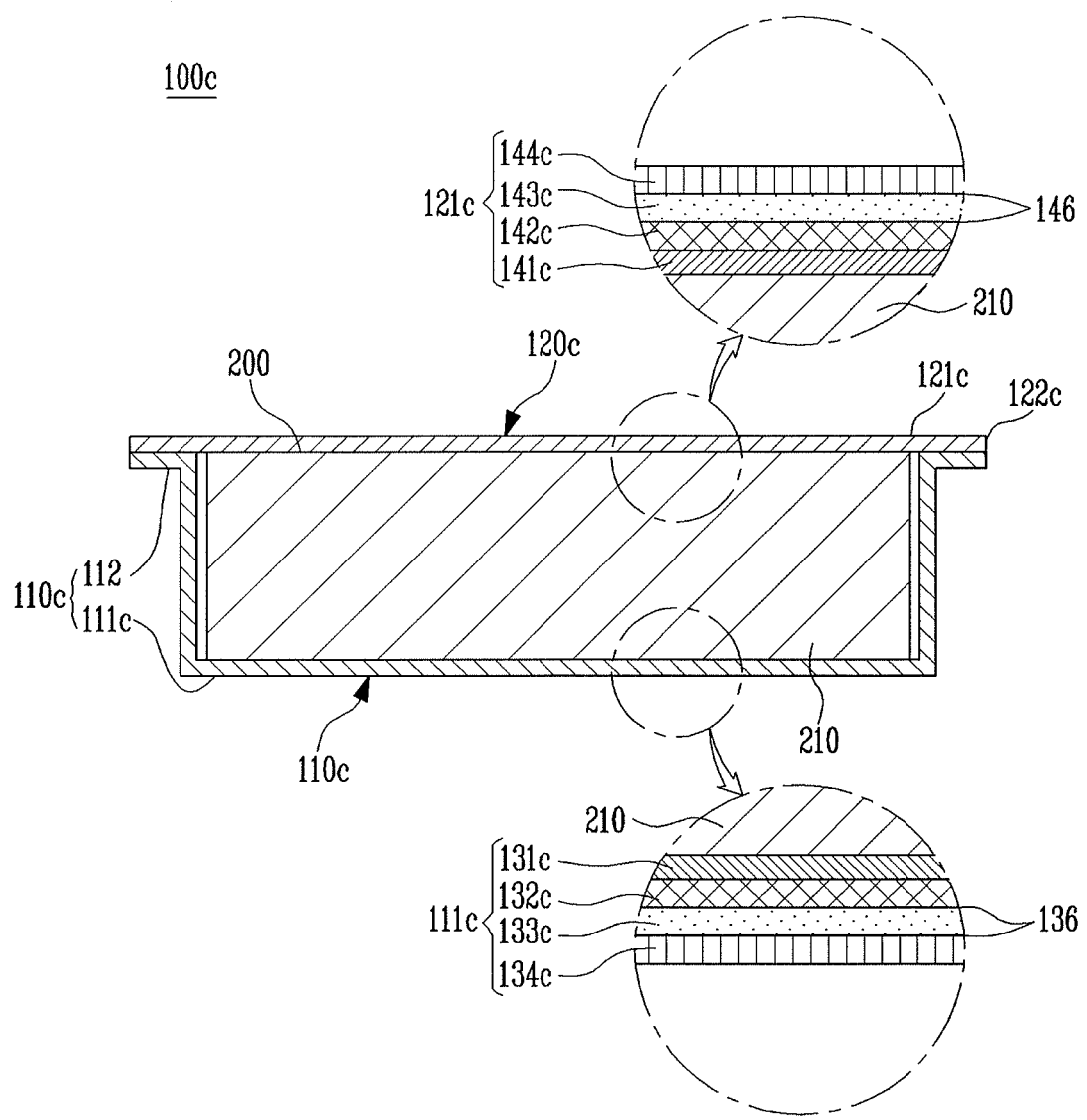

SECONDARY BATTERY

CROSS-REFERENCE TO RELATED APPLICATION

The present application claims priority under 35 U.S.C. § 119(e) to U.S. Provisional Application No. 61/457,745, filed on May 25, 2011, and entitled: "Secondary Battery," which is incorporated herein by reference in its entirety.

BACKGROUND

1. Field

Embodiments relate to a secondary battery.

2. Discussion of the Related Art

A secondary battery is a battery repeatedly used through a discharging process in which a chemical energy is converted into an electrical energy and a charging process which is a reverse process of the discharging process. Various forms and types of secondary batteries are employed as power supply with wide use of portable electronic devices.

Further, as secondary batteries are used for power supply of various devices needing high capacity and high output, extensive studies are conducted to improve safety of secondary batteries.

SUMMARY

According to an embodiment, there is provided a secondary battery including an electrode assembly, and at least one safety member coupled with the electrode assembly, the safety member having a safety layer including a short-circuit heat absorbing material.

The short-circuit heat absorbing material may include a polyethylene material.

The polyethylene material may be a polyethylene wax material. The safety layer may further include a conductive material interspersed in the polyethylene wax material.

The short-circuit heat absorbing material may be a material that is solid at room temperature and meltable in response to heat generated by a short circuit.

The polyethylene wax material may have a number average molecular weight of 3,000 to 10,000.

The safety layer may be thermally fused.

The conductive material may include carbon particles.

The safety member may further include a base layer, and a first adhesive layer that attaches the safety member to the electrode assembly, the safety layer being between the base layer and the first adhesive layer.

The safety member may further include a second adhesive layer between the base layer and the safety layer.

The safety member may further include a ceramic layer between the base layer and the safety layer.

The safety member may further include a second adhesive layer between the ceramic layer and the base layer or between the ceramic layer and the safety layer.

The secondary battery may further include a case that accommodates the electrode assembly. The safety member may be between the electrode assembly and the case.

The safety member may further include an additional safety layer on the base layer and an additional first adhesive layer.

The safety member may further include a ceramic layer between the base layer and the safety layer, and an additional ceramic layer between the base layer and the additional safety layer.

More than one safety member may be disposed between the electrode assembly and the case.

The case may be a pouch case including an accommodating portion accommodating the electrode assembly and a case cover sealed to the accommodating portion.

The safety member may be between the electrode assembly and the case cover.

The accommodating portion may include a bottom and sides. The safety member may be between the electrode assembly and an inner surface of the bottom of the accommodating portion.

The safety member may constitute a portion of a case or case cover within which the electrode assembly is accommodated.

The safety member may correspond in shape and area to a surface of the electrode assembly.

BRIEF DESCRIPTION OF THE DRAWINGS

The above and other features will become more apparent to those of ordinary skill in the art by describing in detail exemplary embodiments with reference to the attached drawings, in which:

FIG. 7 illustrates a cross-sectional view of the secondary battery of FIG. 6.

DETAILED DESCRIPTION

Figure 1:
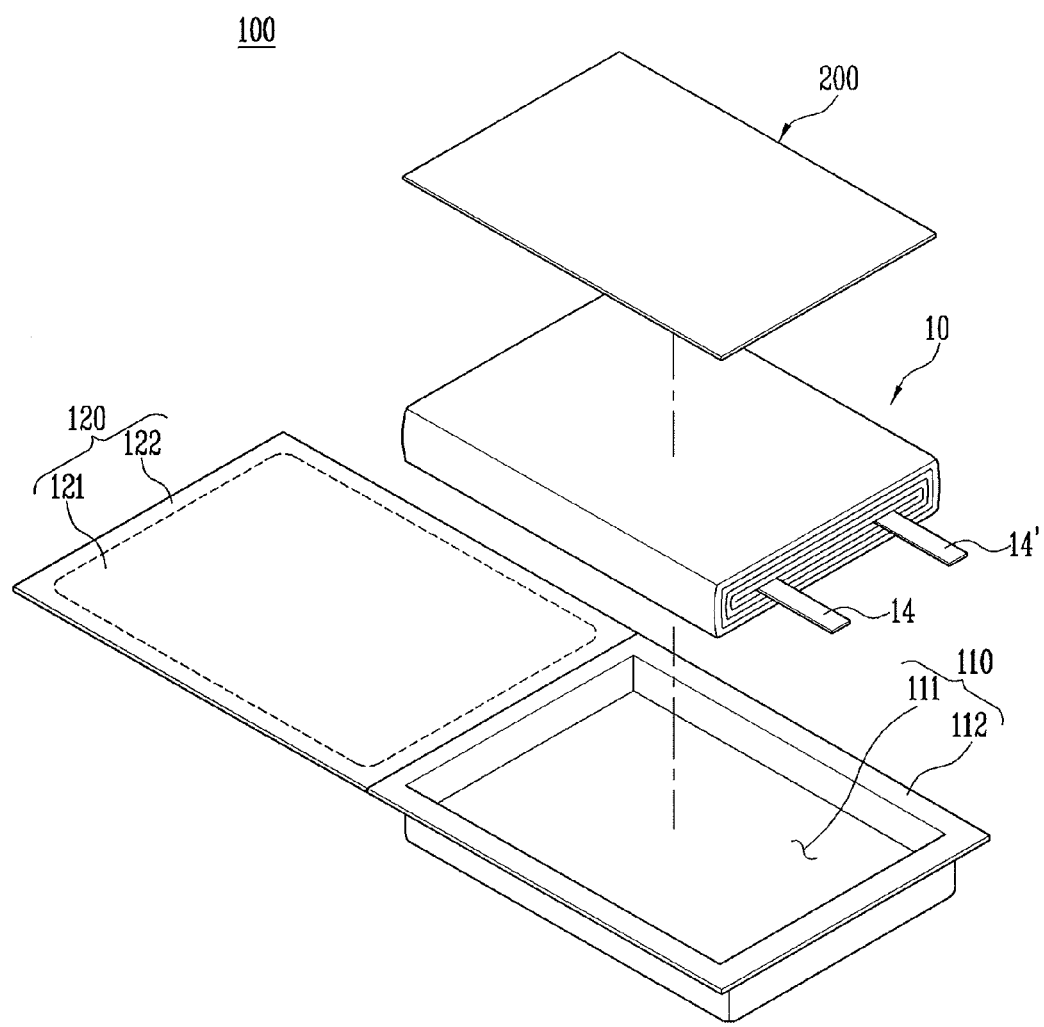
FIG. 1 illustrates an exploded perspective view of a secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
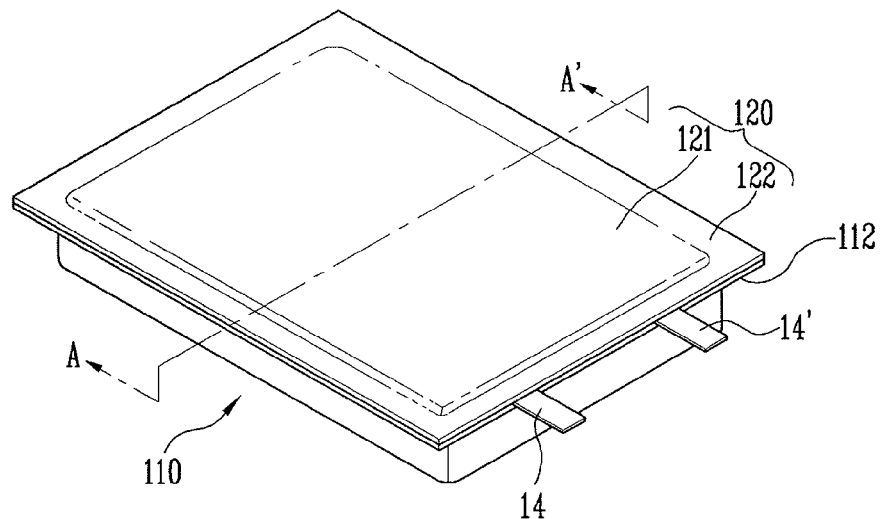
FIG. 2 illustrates a perspective view of the secondary battery of FIG. 1.
Figure 3:
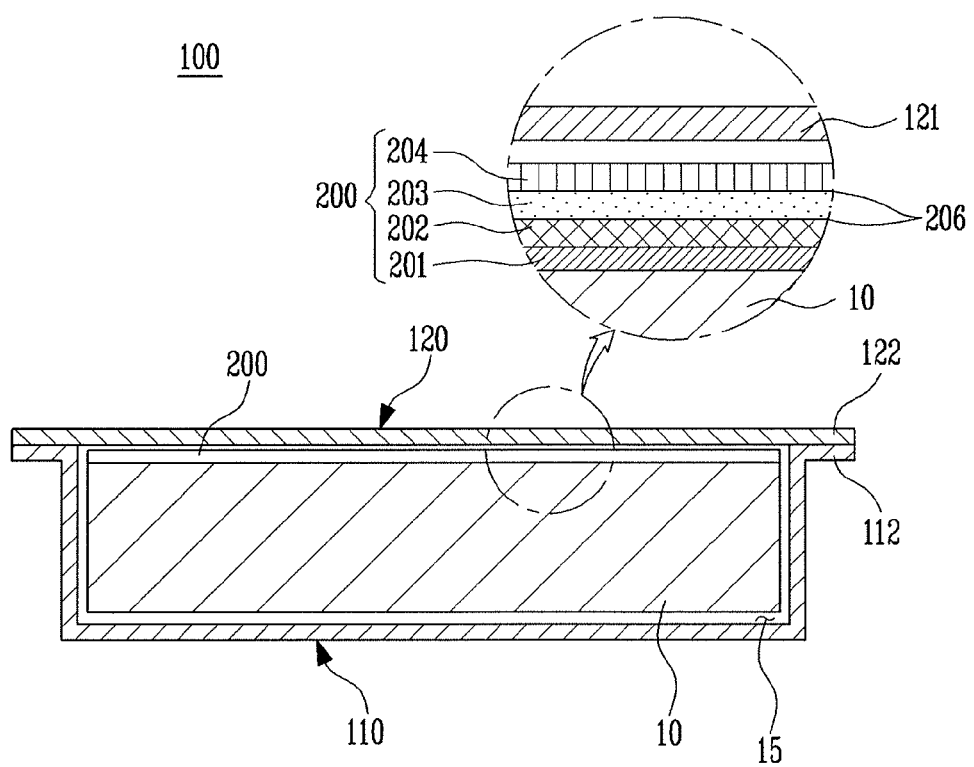
FIG. 3 illustrates a cross-sectional view of the secondary battery of FIG. 2.

A secondary battery according to an exemplary embodiment is described with reference to FIGS. 1 to 3. FIG. 1 is an exploded perspective view of a secondary battery according to the exemplary embodiment, FIG. 2 is a perspective view of the secondary battery of FIG. 1, and FIG. 3 is a cross-sectional view of the secondary battery of FIG. 2.

An electrode assembly 10 may include a first plate, a separator, and a second plate.

The first plate may be formed by applying a positive active material to one side or opposite sides of a positive current collector. Generally, the positive current collector may include any material which has high conductivity and does not induce chemical changes. Further, the positive active material may include a layered compound including lithium. The second plate may be formed by applying a negative active material to one or opposite sides of a negative current collector. The negative current collector may be a conductive metal. The negative active material may include graphite. The separator may be interposed between the first and second plates to prevent the plates from being in contact with each other so as not to cause a short circuit. For example, the separator may include polymer and may be formed as an insulating thin layer having high ion permeability and mechanical strength.

In the present embodiment, the electrode assembly 10 is formed as a jelly-roll type by winding the first plate, the separator, and the second plate, which are stacked. However, the present invention is not limited to the jelly roll type. The electrode assembly may be formed by various ways, e.g., by alternately stacking a plurality of first plates, a plurality of second plates, and a plurality of separators.

In the present embodiment, a battery case is formed in a pouch type, as shown in FIG. 1. The battery case includes a case body 110, and a case cover 120 disposed on the case body 110. The case body 110 includes an accommodating part 111 that accommodates the electrode assembly 10. The accommodating part 111 has an open upper side and is formed with a first sealing part 112 extending outwards on an upper end of the accommodating part 111.

The case cover 120 is formed in a plate shape and includes a center cover part 121 covering the open side of the case body 110 and a second sealing part 122 extending outwards from an edge of the center cover part 121.

First and second electrode tabs 14 and 14' may be respectively formed of electrical conductors. The first and second electrode tabs 14 and 14' may be electrically connected to the first and second plates of the electrode assembly 10, respectively.

An accommodated electrolyte (not shown) may include lithium salts functioning as a source of lithium ions and a non-aqueous organic solvent functioning as a medium for transfer of ions involved in electrochemical reaction. The first plate and the second plate forming the electrode assembly 10 may react with the electrolyte to generate electrochemical energy, and the generated electrochemical energy may be transmitted to the outside through the first and second electrode tabs 14 and 14'.

As shown in FIG. 3, a safety member 200 is coupled to the electrode assembly 10. The safety member 200 may be formed in a plate shape of a plurality of layers. The safety member 200 may be disposed between the electrode assembly 10 and the case cover 120. However, the position of the safety member 200 is not limited thereto. The safety member 200 may be interposed between the electrode assembly 10 and any one side of a plurality of sides of the case body 110. The safety member 200 may have a size that corresponds to the size of the electrode assembly 10 between the electrode assembly 10 and the case.

The safety member 200 may include a base layer 204, a ceramic layer 203, a safety layer 202, and a first adhesive layer 201, sequentially positioned from the outside of the case cover 120.

The base layer 204 may be provided to maintain an overall shape of the safety member 200. The base layer 204 may be formed of a metal material to securely maintain the shape of the safety member 200. For example, the base layer 204 may be made of aluminum, steel, stainless steel, or the like.

The ceramic layer 203 may be disposed between the base layer 204 and the safety layer 202. The ceramic layer 203, if present, helps to maintain the shape of the safety member 200 and functions to insulate opposite sides of the ceramic layer 203 from each other. The ceramic layer 203 may be omitted.

The safety layer 202 is thermally fused, that is, fused by heat. Here, the safety layer 202 may include polyethylene (PE) wax blended with carbon particles, and the carbon particles may be conductive. Further, the PE wax may have a number average molecular weight of 3,000 to 10,000.

The safety layer 202 exists in a wax form at room temperature and is melted by heat to have fluidity. For example, when the secondary battery 100 short-circuits by nailing or crushing, the PE wax is melted by heat generated by current flowing to the carbon particles of the safety layer 202 and heat generated in the electrode assembly 10, thereby absorbing a certain amount of heat. That is, the safety layer 202 absorbs internal accumulated heat generated in a short-circuited area of the secondary battery 100, thereby preventing the secondary battery 100 from further igniting. Accordingly, the safety of the secondary battery 100 is improved.

The first adhesive layer 201 may be disposed between the safety layer 202 and the electrode assembly 10. The first adhesive layer 201 may be provided to attach the safety member 200 to the electrode assembly 10. For example, the first adhesive layer 201 may be formed of an adhesive synthetic resin, such as an acrylic resin.

A second adhesive layer 206 may be formed between the base layer 204, the ceramic layer 203, and the safety layer 202 to improve adhesion. When the ceramic layer 203 is not present, the second adhesive layer 206 may be formed between the base layer 204 and the safety layer 202. When the ceramic layer 203 is present, as shown in FIG. 3, the second adhesive layer 206 may be formed between the base layer 204 and the ceramic layer 203, and between the ceramic layer 203 and the safety layer 202. The second adhesive layer 206 may include a PVDF adhesive.

The secondary battery 100 according to the present embodiment may be manufactured as follows. First, the electrode assembly 10 and the safety member 200 may be accommodated in the accommodating part 111, and the electrolyte (not shown) may be put into the accommodating part 111. Then, as shown in FIG. 2, the case cover 120 may be attached to the case body 110 while the first and second electrode tabs 14 and 14' are exposed out of the case 110 and 120. Finally, the first sealing part 112 and the second sealing part 122 may be thermally fused, thereby sealing the case 110 and 120.

In this process, a pouch-type secondary battery may be manufactured. However, the present embodiments are not limited to a pouch type. Any secondary battery may include a safety member as disclosed herein, thereby obtaining the same or similar effects.

Figure 4:
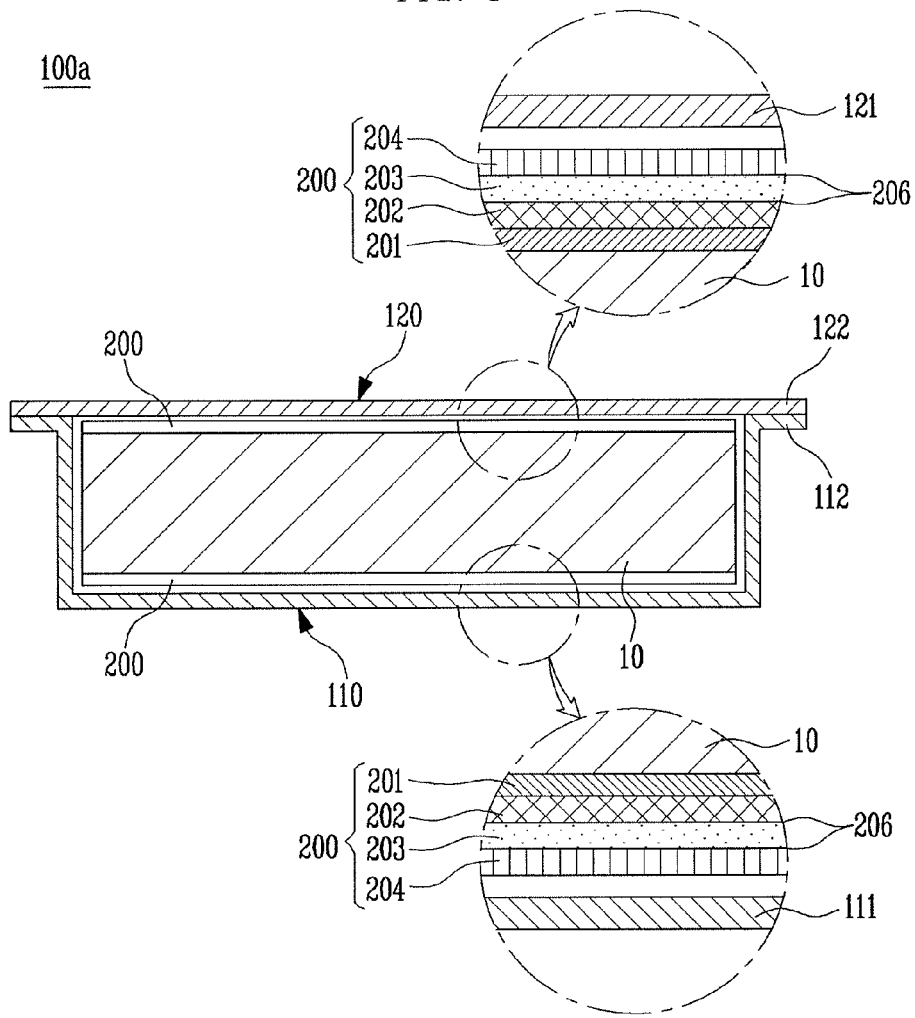
FIG. 4 illustrates a cross-sectional view of a secondary battery according to another exemplary embodiment.

A secondary battery according to another exemplary embodiment is described with reference to FIG. 4. FIG. 4 is a cross-sectional view of the secondary battery according to the other exemplary embodiment. As shown in FIG. 4, at least one safety member 200 may be provided. That is, safety members 200 may be disposed on both upper and lower sides of an electrode assembly 10. As desired, a plurality of safety members 200 may be provided in any position between the electrode assembly 10 and a case 110 and 120.

Figure 5:
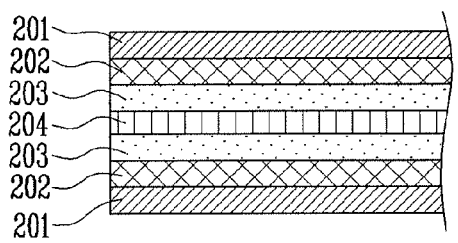
FIG. 5 illustrates a cross-sectional view of a safety member according to another exemplary embodiment.

A safety member 200b according to another exemplary embodiment is described with reference to FIG. 5. FIG. 5 is a cross-sectional view of the safety member according to the other exemplary embodiment. As shown in FIG. 5, the safety member 200b may include layers symmetrically formed on opposite sides of a base layer 204, based on the base layer 204. Ceramic layers 203 may be symmetrically disposed on upper and lower sides of the base layer 204, respectively, and safety layers 202 may be symmetrically disposed thereon. Characteristics and functions of the respective layers may be the same as or similar to those in the foregoing embodiment. In the embodiment of FIG. 5, the plurality of safety layers may provide a higher heat capacity, thereby absorbing more ambient heat.

Figure 6:
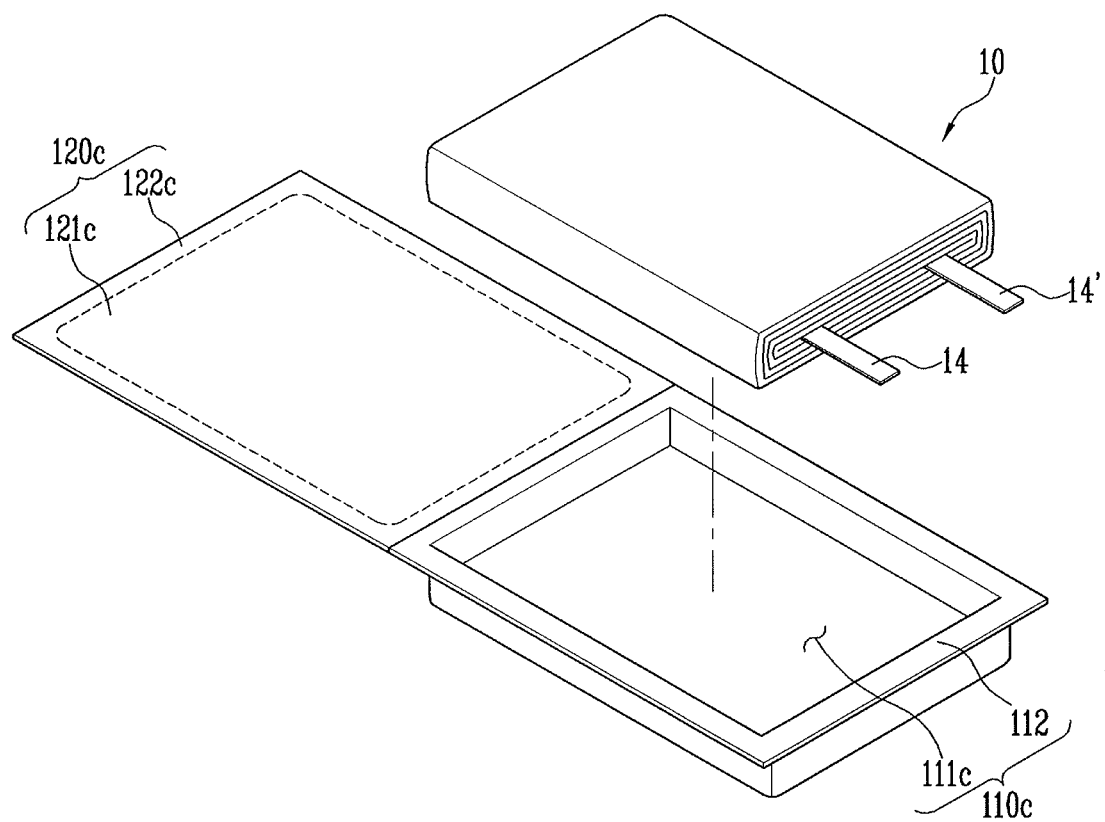
FIG. 6 illustrates an exploded perspective view of a secondary battery according to still another exemplary embodiment.

A secondary battery according to still another exemplary embodiment is described with reference to FIGS. 6 to 7. FIG. 6 is an exploded perspective view of the secondary battery according to the still other exemplary embodiment, and FIG. 7 is a cross-sectional view of the secondary battery of FIG. 6.

The secondary battery according to the embodiment of FIGS. 6 and 7 may have a case including a safety member as a single unit. TAs shown in FIG. 6, an electrode assembly 10 is accommodated in a case cover 120c without a separate safety member, and then the secondary battery is manufacture as described above. For example, the safety member may constitute a portion of the case cover.

A case cover 120c is described first. As shown in FIG. 7, the case cover 120c includes a base layer 144c, a ceramic layer 143c, a safety layer 142c, and a first adhesive layer 141c, from the outside to the inside. Here, the first adhesive layer 141c may be applied to at least part of the safety layer 142c.

The respective layers of the case cover 120c perform the same or similar functions to the layers described above in the foregoing embodiment. That is, the safety layer 142c may be fused by heat and may include PE wax and carbon particles. The ceramic layer 143c may be omitted and, if present, helps to maintain the shape of the case cover 120c. The first adhesive layer 141c is disposed between the safety layer 142c and the electrode assembly 10, so that the safety layer 142c is attached to the electrode assembly 10.

In FIG. 7, the case body 110c includes a base layer 134c, a ceramic layer 133c, a safety layer 132c, and a first adhesive layer 131c, from the outside to the inside, as well as the case cover 120c. For example, the safety member constitutes a portion 111c of the case 110c within which the electrode assembly 210 is accommodated. The respective layers have the same configuration and functions as those of the case cover 120c.

The innermost first adhesive layers 141c and 131c of the case body 110c and the case cover 120c may be formed on at least one side of the case body 110c and the case cover 120c.

In the present embodiment, a second adhesive layer 146 may also be formed between the base layer 144c, the ceramic layer 143c, if present, and the safety layer 142c to improve adhesion. When the ceramic layer 143c is not present, the second adhesive layer 146 may be formed between the base layer 144c and the safety layer 142c. Further, a second adhesive layer 136 may also be formed between the base layer 134c, the ceramic layer 133c, and the safety layer 132c. The second adhesive layer 146 may include a PVDF adhesive.

By way of summation and review, embodiments are directed to a secondary battery preventing ignition under unusual conditions. In particular, the embodiments disclosed herein relate to a secondary battery which does not ignite by misuse, such as nailing or crushing, when the secondary battery operates with high capacity. Hence, high output may be safely provided according to embodiments described herein. According to the exemplary embodiments, when heat is generated by misuse, such as nailing or crushing in the operation of a high-capacity and high-output secondary battery, the heat is maximally absorbed by the safety member, thereby preventing ignition.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A secondary battery, comprising:
an electrode assembly,
a case that accommodates the electrode assembly; and
at least one safety member between the electrode assembly and the case and coupled with the electrode assembly, the safety member including:
a base layer,
a safety layer including a short-circuit heat absorbing material, and
a first adhesive layer that attaches the safety member to the electrode assembly, the safety layer being between the base layer and the first adhesive layer.

2. The secondary battery as claimed in claim 1, wherein the short-circuit heat absorbing material includes a polyethylene material.

3. The secondary battery as claimed in claim 2, wherein:
the polyethylene material is a polyethylene wax material, and
the safety layer further includes a conductive material interspersed in the polyethylene wax material.

4. The secondary battery as claimed in claim 3, wherein the short-circuit heat absorbing material is such as to be solid at room temperature and such as to be meltable in response to heat generated by a short circuit.

5. The secondary battery as claimed in claim 3, wherein the polyethylene wax material has a number average molecular weight of 3,000 to 10,000.

6. The secondary battery as claimed in claim 3, wherein the safety layer is thermally fused.

7. The secondary battery as claimed in claim 3, wherein the conductive material includes carbon particles.

8. The secondary battery as claimed in claim 1, wherein the safety member further includes a second adhesive layer between the base layer and the safety layer.

9. The secondary battery as claimed in claim 1, wherein the safety member further includes a ceramic layer between the base layer and the safety layer.

10. The secondary battery as claimed in claim 9, wherein the safety member further includes a second adhesive layer between the ceramic layer and the base layer or between the ceramic layer and the safety layer.

11. The secondary battery as claimed in claim 1, wherein the safety member further includes:
an additional safety layer on the base layer, and
an additional first adhesive layer.

12. The secondary battery as claimed in claim 11, wherein the safety member further includes:
a ceramic layer between the base layer and the safety layer, and
an additional ceramic layer between the base layer and the additional safety layer.

13. The secondary battery as claimed in claim 1, wherein more than one safety member is disposed between the electrode assembly and the case.

14. The secondary battery as claimed in claim 1, wherein:
the case is a pouch case including an accommodating portion accommodating the electrode assembly and a case cover sealed to the accommodating portion.

15. The secondary battery as claimed in claim 14, wherein the safety member is between the electrode assembly and the case cover.

16. The secondary battery as claimed in claim 14, wherein the accommodating portion includes a bottom and sides, and the safety member is between the electrode assembly and an inner surface of the bottom of the accommodating portion.

17. A secondary battery, comprising:
an electrode assembly,
a case that accommodates the electrode assembly, the case including an accommodating portion accommodating the electrode assembly and a case cover sealed to the accommodating portion; and
at least one safety member, the safety member including:
a base layer,
a safety layer including a short-circuit heat absorbing material, and
a first adhesive layer that attaches the safety member to the electrode assembly, the safety layer being between the base layer and the first adhesive layer,
wherein the safety member constitutes a portion of the accommodating portion of the case within which the electrode assembly is accommodated or a portion of the case cover.

18. The secondary battery as claimed in claim 1, wherein the safety member corresponds in shape and area to a surface of the electrode assembly.

19. The secondary battery as claimed in claim 1, wherein the safety member is a separate component from the case.

* * * * *